(12) United States Patent
Braun et al.

(10) Patent No.: US 10,102,104 B2
(45) Date of Patent: Oct. 16, 2018

(54) THREAD DUMP VIEWER

(71) Applicants: Matthias Braun, Illingen (DE); Dietrich Mostowoj, Ludwigshafen am Rhein (DE); Ralf Schmelter, Wiesloch (DE); Johannes Scheerer, Heidelberg (DE); Steffen Schreiber, Frankenthal (DE); Thomas Klink, Moerlenbach (DE); Michael Wintergerst, Muelhausen (DE)

(72) Inventors: Matthias Braun, Illingen (DE); Dietrich Mostowoj, Ludwigshafen am Rhein (DE); Ralf Schmelter, Wiesloch (DE); Johannes Scheerer, Heidelberg (DE); Steffen Schreiber, Frankenthal (DE); Thomas Klink, Moerlenbach (DE); Michael Wintergerst, Muelhausen (DE)

(73) Assignee: SAP SE, Walldorf (DE)

( * ) Notice: Subject to any disclaimer, the term of this patent is extended or adjusted under 35 U.S.C. 154(b) by 498 days.

(21) Appl. No.: 14/490,257

(22) Filed: Sep. 18, 2014

(65) Prior Publication Data

US 2016/0085657 A1    Mar. 24, 2016

(51) Int. Cl.
*G06F 11/36* (2006.01)
*G06F 11/32* (2006.01)
*G06F 11/34* (2006.01)

(52) U.S. Cl.
CPC ............ *G06F 11/36* (2013.01); *G06F 11/323* (2013.01); *G06F 11/3466* (2013.01); *G06F 11/366* (2013.01)

(58) Field of Classification Search
CPC .. G06F 11/366; G06F 11/0715; G06F 11/079; G06F 11/0751; G06F 11/0778; G06F 11/3476
See application file for complete search history.

(56) References Cited

U.S. PATENT DOCUMENTS

| 7,594,234 B1 * | 9/2009 | Dice | G06F 9/526 |
| | | | 718/100 |
| 8,626,904 B1 * | 1/2014 | Olliff | G06F 9/524 |
| | | | 709/224 |

(Continued)

OTHER PUBLICATIONS

"DeveloperWorks: IBM Monitoring and Diagnostic Tools for Java—Dump Analyzer Version 2.2", [Online]. Retrieved from the Internet: <URL: http://www/ibm.com/developerworks/java/jdk/tools/dumpanalyzer/, (Accessed Aug. 15, 2014), 3 pgs.

(Continued)

*Primary Examiner* — Jigar P Patel
(74) *Attorney, Agent, or Firm* — Schwegman Lundberg & Woessner, P.A.

(57) ABSTRACT

A thread dump viewer presents information for a plurality of threads. The information about the threads can be presented in a table view. The thread dump viewer can allow the user to expand a thread in the table view to see a stack trace for the thread. The stack trace may include information for objects that are associated with other threads. For example, the thread may be waiting on a lock object locked by another thread. The thread dump viewer can present information about the associated thread based on a user interaction. This process can be continued iteratively, allowing the stack traces of interrelated threads to be seen to arbitrary depths.

16 Claims, 12 Drawing Sheets

(56) References Cited

U.S. PATENT DOCUMENTS

2007/0220513 A1\* 9/2007 Hwang .................. G06F 9/524
718/1
2011/0252407 A1\* 10/2011 Rochette ............ G06F 11/3636
717/128
2012/0079596 A1\* 3/2012 Thomas .................. G06F 21/55
726/24

OTHER PUBLICATIONS

"Samurai—a GUI based tail, thread dump analysis tool", Yusuke Yamamoto, [Online]. Retrieved from the Internet: <URL: http://samaraism.jp/samurai/en/index.html, (Accessed Aug. 15, 2014), 7 pgs.

"TDA—Thread Dump Analyzer", Ingo Rockel, (Sep. 2008), 21 pgs.

Lange, Fabian, "Create and Understand Java Heapdumps (Act 4)", codecentric Blog, [Online]. Retrieved from the Internet: <URL: https://blog.codecentric.de/en/2011/08/create-and-understand-java-headumps-act-4>, (Aug. 4, 2011), 10 pgs.

Vogel, Lars, "Eclipse Memory Analyzer (MAT)—Tutorial", Version 1.1, [Online]. Retrieved from the Internet: <URL: http://www.vogella.com/tutorials/EclipseMemoryAnalyzer/article.htm >, (Apr. 30, 2013), 6 pgs.

\* cited by examiner

| Thread | KernelId | Allocation | File Bytes read | File Bytes written |
|---|---|---|---|---|
| > Managed_Application_Thread_57 | 31916245 | 12.2 GB | 630 KB | 0 B |
| > HTTP Worker [@845752750] | 22610217 | 16.5 GB | 10.2 MB | 13.5 MB |
| > HTTP Worker [@1151904289] | 2365881 | 15.2 GB | 1.60 MB | 593 KB |
| > HTTP Worker [@1892238894] | 29294651 | 15.3 GB | 6.97 MB | 1.14 MB |
| > Agent Server Connection | 213364923 | 31.1 GB | 314 KB | 0 B |
| ▼ Agent Heartbeat | 18219443 | 5.86 GB | 181 KB | 91.3 KB |
| ◀ com.sun.jmx.interceptor.DefaultMBeanServerInterceptor.getMBean line 1088 blocked on a com.sun.jmx.interceptor.DefaultMBeanServerInterceptor [id = 9985485496] com.sun.jmx.interceptor.DefaultMBeanServerInterceptor.getAttribute line 662 com.sun.jmx.mbeanserver.JmxMBeanServer.getAttribute line 638 24 other lines > | | | | |
| > Application [39] | 3866747 | 5.96 GB | 197 KB | 273 KB |
| > Application [14] | 17498365 | 5.78 GB | 1.47 MB | 947 KB |
| > Galaxy 860328 / Follower Worker | 224133553 | 5.40 GB | 561 KB | 334 KB |

FIG. 6

FIG. 7 thread dump 3211594.prf > Thread Dumps 1 > Thread Dump 6 ← 410

<enter a string to search>   x   ⇧⇩   + −  ← 420

| Thread | KernelId | Allocation | File Bytes read | File Bytes written |
|---|---|---|---|---|
| ▼ Agent Heartbeat | 18219443 | 5.86 GB | 181 KB | 91.3 KB |
| ▲ com.sun.jmx.interceptor.DefaultMBeanServerInterceptor.getMBean line 1088 | | | | |
| ▲ blocked on a com.sun.jmx.interceptor.DefaultMBeanServerInterceptor [id = 9985485496] | | | | |
| ▲ HTTP Worker [@1697950221]  40763465  52.2 MB  768 B  0 B | | | | |
| com.sun.jmx.mbeanserver.Repository.addAllMatching line 217 | | | | |
| com.sun.jmx.mbeanserver.Repository.query line 568 | | | | |
| ▲ com.sun.jmx.interceptor.DefaultMBeanServerInterceptor.queryNamesImpl line 569 | | | | |
|   locked a com.sun.jmx.interceptor.DefaultMBeanServerInterceptor [id = 9985485496] | | | | |
| ▶ Agent Heartbeat | 18219443 | 5.86 GB | 181 KB | 91.3 KB |
| HTTP Worker [@1127....  39190769  16.6 MB  51.5 KB  0 B | | | | |
| com.sun.jmx.interceptor.DefaultMBeanServerInterceptor.getMBean line 1088 | | | | |
| com.sun.jmx.mbeanserver.JmxMBeanServer.queryNames line 559 | | | | |
| 61 other lines > | | | | |
|   61 other threads | | | | |
| ▶ HTTP Worker [@1151....  23658881  15.2 GB  1.60 MB  593 KB | | | | |
| com.sun.jmx.interceptor.DefaultMBeanServerInterceptor.queryNames line 579 | | | | |
| com.sun.jmx.mbeanserver.JmxMBeanServer.getAttribute line 638 | | | | |
| 55 other lines > | | | | |
|   55 other threads | | | | |
| com.sun.jmx.interceptor.DefaultMBeanServerInterceptor.getAttribute line 662 | | | | |
| com.sun.jmx.mbeanserver.JmxMBeanServer.getAttribute line 638 | | | | |
| 24 other lines > | | | | |
| ▶ Application [39] | 3866747 | 5.96 GB | 197 KB | 273 KB |

| thread dump 3211594.prf > Thread Dumps 1 > Thread Dump 6 ←410 | | | | |
|---|---|---|---|---|
| <enter a string to search> ×  ⇦ ⇨  + − ←420 | | | | |
| Thread | KernelId | Allocation | File Bytes read | File Bytes written |
| ▼ Agent Heartbeat | 18219443 | 5.86 GB | 181 KB | 91.3 KB ←820 |
|   ▼ com.sun.jmx.interceptor.DefaultMBeanServerInterceptor.getMBean line 1088 | | | | |
|   blocked on a com.sun.jmx.interceptor.DefaultMBeanServerInterceptor [id = 9985485496] | | | | |
| 730→ ▼ HTTP Worker [@1697950221] | 40763465 | 52.2 MB | 768 B | 0 B |
| 830→   ▼ com.sun.jmx.interceptor.DefaultMBeanServerInterceptor.queryNamesImpl line 569 | | | | |
|   blocked on a com.sun.jmx.interceptor.DefaultMBeanServerInterceptor [id = 9982978421] | | | | |
| 840→ ▼ HTTP Worker [@1127... | 39190769 | 16.6 MB | 51.5 KB | 0 B |
| 850→   com.sun.jmx.interceptor.DefaultMBeanServerInterceptor.getMBean line 1088 | | | | |
|     com.sun.jmx.interceptor.DefaultMBeanServerInterceptor.getAttribute line 662 | | | | |
|     61 other lines > | | | | |
|     61 other threads | | | | |
| 780→ > HTTP Worker [@1151.... | 23658881 | 15.2 GB | 1.60 MB | 593 KB |
|     com.sun.jmx.interceptor.DefaultMBeanServerInterceptor.queryNames line 559 | | | | |
|     com.sun.jmx.mbeanserver.JmxMBeanServer.queryNames line 579 | | | | |
|     55 other lines > | | | | |
|     55 other threads | | | | |
|     com.sun.jmx.interceptor.DefaultMBeanServerInterceptor.getAttribute line 662 | | | | |
|     com.sun.jmx.mbeanserver.JmxMBeanServer.getAttribute line 638 | | | | |
|     24 other lines > | | | | |
| > Application [39] ←440 | 3866747 | 5.96 GB | 197 KB | 273 KB |
|  | ↑450 | ↑520 | ↑530 | ↑540 |

THREAD DUMP VIEWER

TECHNICAL FIELD

The subject matter disclosed herein generally relates to the processing of data. Specifically, the present disclosure addresses systems and methods for processing and presenting thread dumps.

BACKGROUND

Application developers use thread dumps to help identify problems in applications being developed. The thread dump often includes information about one or more threads of an application. For example, the thread dump can indicate the current method executing in each thread, along with a stack trace for the thread. An application developer may use a tool to view the thread dump and more easily navigate the presented data.

Viewing tools present a number of options to users. A user can select a dump to view from a list of available dumps. After a selected dump has been loaded, information for each thread can be presented in a table. Alternative views may also be available, such as a view of total memory allocation organized by the type of object consuming the memory.

BRIEF DESCRIPTION OF THE DRAWINGS

Some embodiments are illustrated by way of example and not limitation in the figures of the accompanying drawings.

FIG. 6 is a user interface diagram, according to some example embodiments, suitable for implementing a thread dump viewer.

FIG. 7 is a user interface diagram, according to some example embodiments, suitable for implementing a thread dump viewer.

FIG. 8 is a user interface diagram, according to some example embodiments, suitable for implementing a thread dump viewer.

DETAILED DESCRIPTION

Example methods and systems are directed to presenting thread dumps. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A thread dump viewer can present aggregate data for a thread dump. For example, the time of the dump, the number of threads in the dump, the total memory usage by all threads in the dump, and so on may be presented. In addition to or instead of this aggregate data, details for individual threads can be presented. For example, the current methods being executed by a thread, the number of files opened by the thread, the number of sockets opened by the thread, the amount of I/O performed by the thread, and so on may be presented.

The thread dump viewer can present information about the threads in a table view. For example, one row for each thread may be provided with information such as an identifier for the thread, a total run time for the thread, an amount of memory consumed by the thread, and so on. The thread dump viewer can allow the user to expand a thread in the table view to see the stack trace for the thread. For example, the stack trace may be presented in a tooltip, in a pop-up window, or in-line with the table data in response to the user touching, hovering, or clicking on an element in the table. The stack trace may include information for objects that are associated with other threads. For example, the thread may be waiting on a lock object locked by another thread. The thread dump viewer can present information about the associated thread based on a user interaction. For example, the user may click on the name of the lock object to cause a stack trace for the associated thread to be presented. This process can be continued iteratively, allowing the stack traces of interrelated threads to be seen to arbitrary depths.

Figure 1:
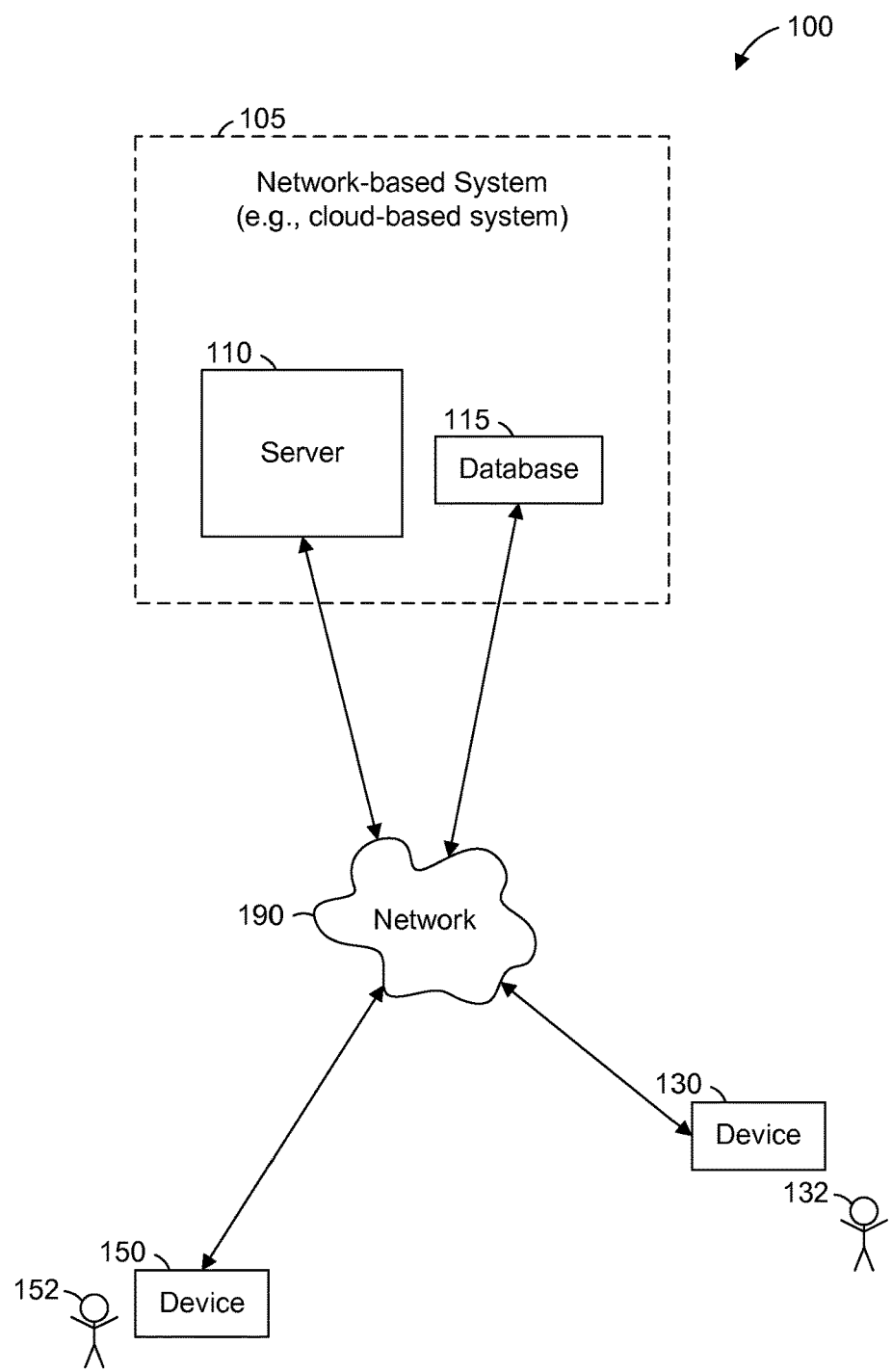
FIG. 1 is a network diagram illustrating a network environment suitable for a thread dump viewer, according to some example embodiments.

FIG. 1 is a network diagram illustrating a network environment 100 suitable for a thread dump viewer, according to some example embodiments. The network environment 100 includes a server machine 110, a database 115, and devices 130 and 150, all communicatively coupled to each other via a network 190. The server machine 110 and the database 115 may collectively comprise a cloud-based system 105 capable of responding to client requests from the devices 130 and 150. The server machine 110 and the devices 130 and 150 may each be implemented in a computer system, in whole or in part, as described below with respect to FIG. 12.

Also shown in FIG. 1 are users 132 and 152. One or both of the users 132 and 152 may be a human user, a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
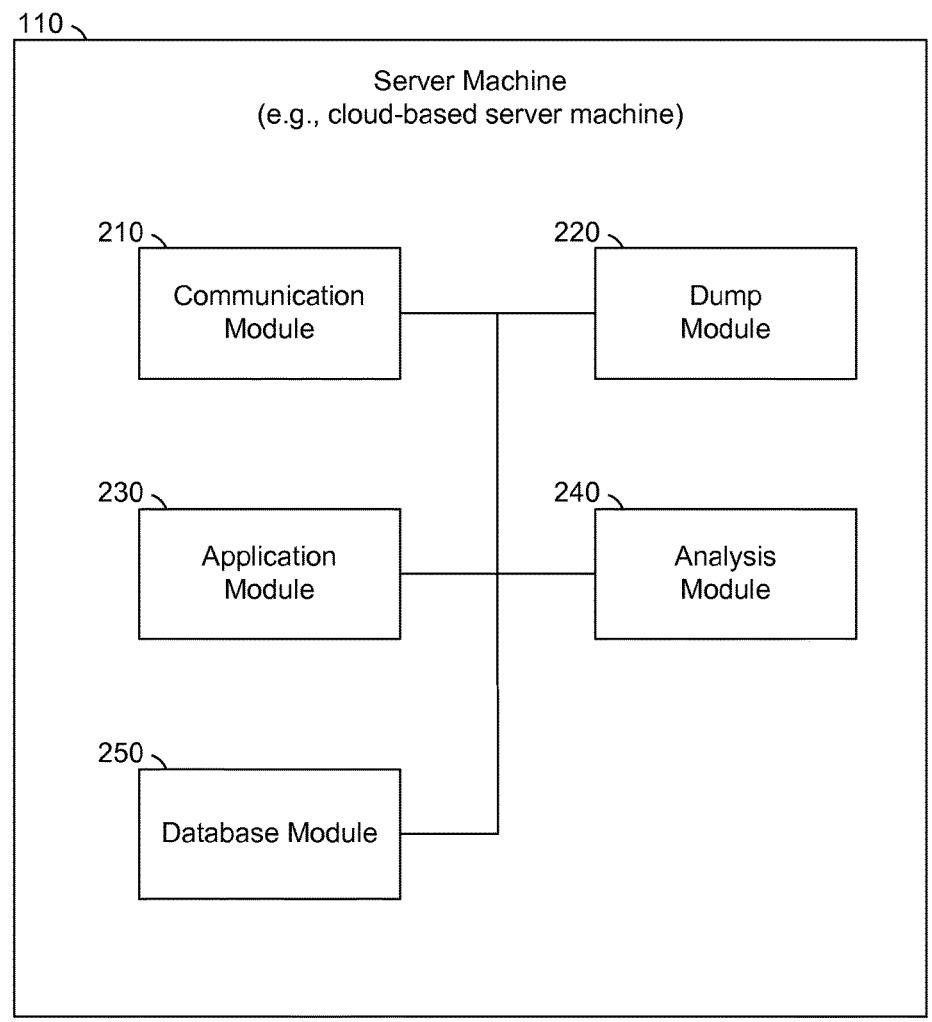
FIG. 2 is a block diagram of a server machine, according to some example embodiments, suitable for implementing a thread dump viewer.

FIG. 2 is a block diagram illustrating components of the server machine 110, according to some example embodiments. The server machine 110 is shown as including a communication module 210, a dump module 220, an application module 230, an analysis module 240, and a database module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The operations of the modules 210-250 are discussed in more detail below in the discussion of FIGS. 4-11. The communication module 210 receives requests to generate thread dumps, present a thread dump viewer, show a thread dump stack trace, and so on. The dump module 220 generates thread dumps for an application run by an application module 230. The dump module 220 and the application module 230 may be a single module. For example, a Java virtual machine (JVM) that runs an application may also generate the thread dump for the application. The dump module 220 and the application module 230 may be separate modules. For example, a separate software or hardware tool can be used to take a snapshot of data stored in memory (e.g., random access memory (RAM), solid state memory, hard disk memory, etc.) and generate a thread dump for the application being analyzed. The thread dumps may be retrieved from a database by the database module 250.

A thread dump contains information for one or more threads of an application, and may also contain additional information for the application itself. Information for a single thread includes one or more of the following: an identifier, a name, a priority, a scheduler state (e.g., sleeping, running, blocked, or waiting), and a stack trace. The information provided for the thread is current as of the time of the thread dump. A stack trace for a thread can include the called methods and lock object information.

The thread dump may also include additional information for the thread, such as the total CPU time the thread has consumed, the elapsed time the thread has been running, the total amount of memory allocated by the thread (e.g., the total number of bytes allocated in the heap), the number of files opened by the thread, the number of sockets opened by the thread, the number of bytes read and written to each file or socket, and the current file or socket being accessed if the stack trace shows that the thread is currently performing a file- or network-related operation, respectively.

The analysis module 240 analyzes the generated thread dump. For example, a data structure containing information regarding each thread in the thread dump may be generated for faster processing during presentation. The communication module 210 can respond to a request for thread view data by communicating the results of the analysis. For example, the analysis may be transmitted over a network to a communication module 310 of a user device (shown in FIG. 3) or presented on a user interface via a user interface (UI) module 360 of the user device (also shown in FIG. 3).

Figure 3:
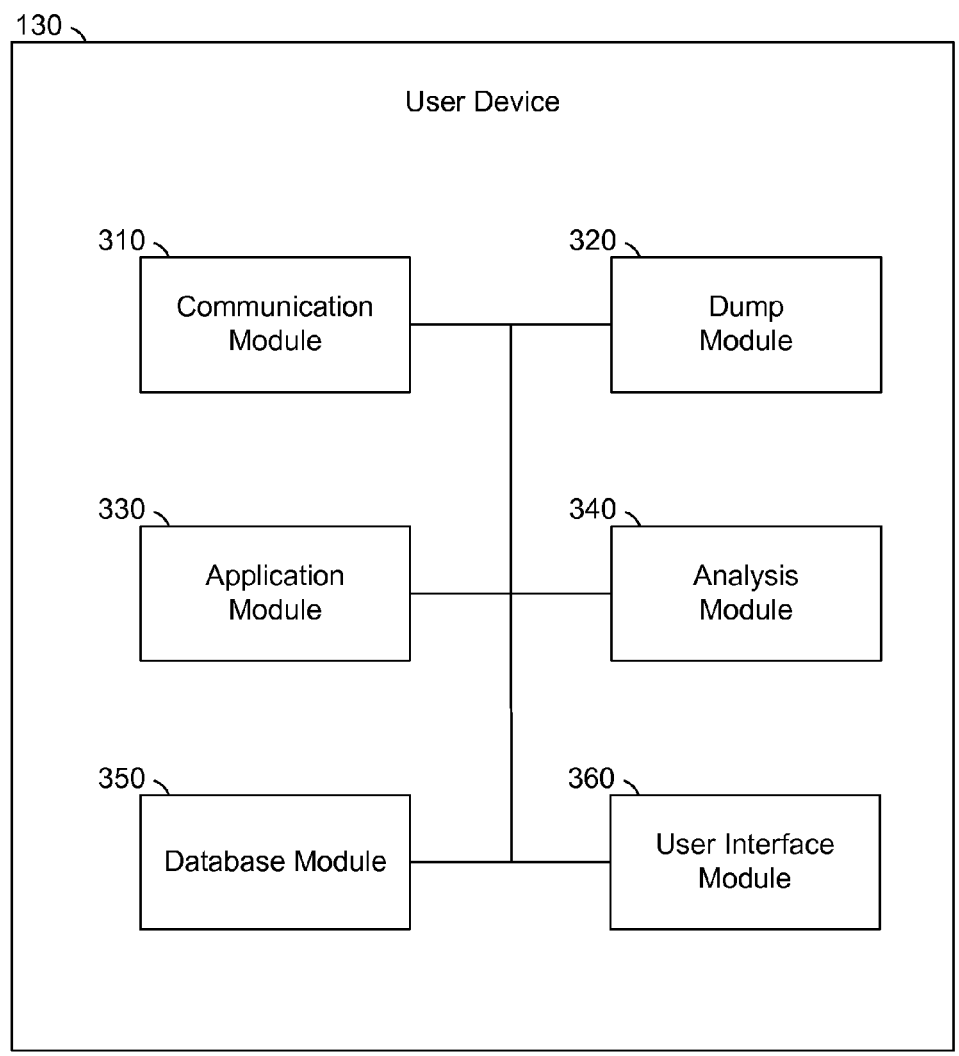
FIG. 3 is a block diagram of a user device, according to some example embodiments, configured to implement a thread dump viewer.

FIG. 3 is a block diagram illustrating components of the user device 130 or 150, according to some example embodiments. The user device 130 or 150 is shown as including a communication module 310, a dump module 320, an application module 330, an analysis module 340, a database module 350, and a user interface (UI) module 360 all configured to communicate with each other (e.g., via a bus, shared memory, or a switch). The modules 310-350 may be implemented in a manner similar to the corresponding modules 210-250, as described above with respect to FIG. 2.

The UI module 360 presents an interactive user interface to a user of the device 130 or 150. Example user interface diagrams are shown in FIGS. 4-8, but other interfaces may also be presented by the device 130 or 150. The user interface may be presented on a web browser, from a dedicated application, or from within a component of a larger application.

Figure 4:
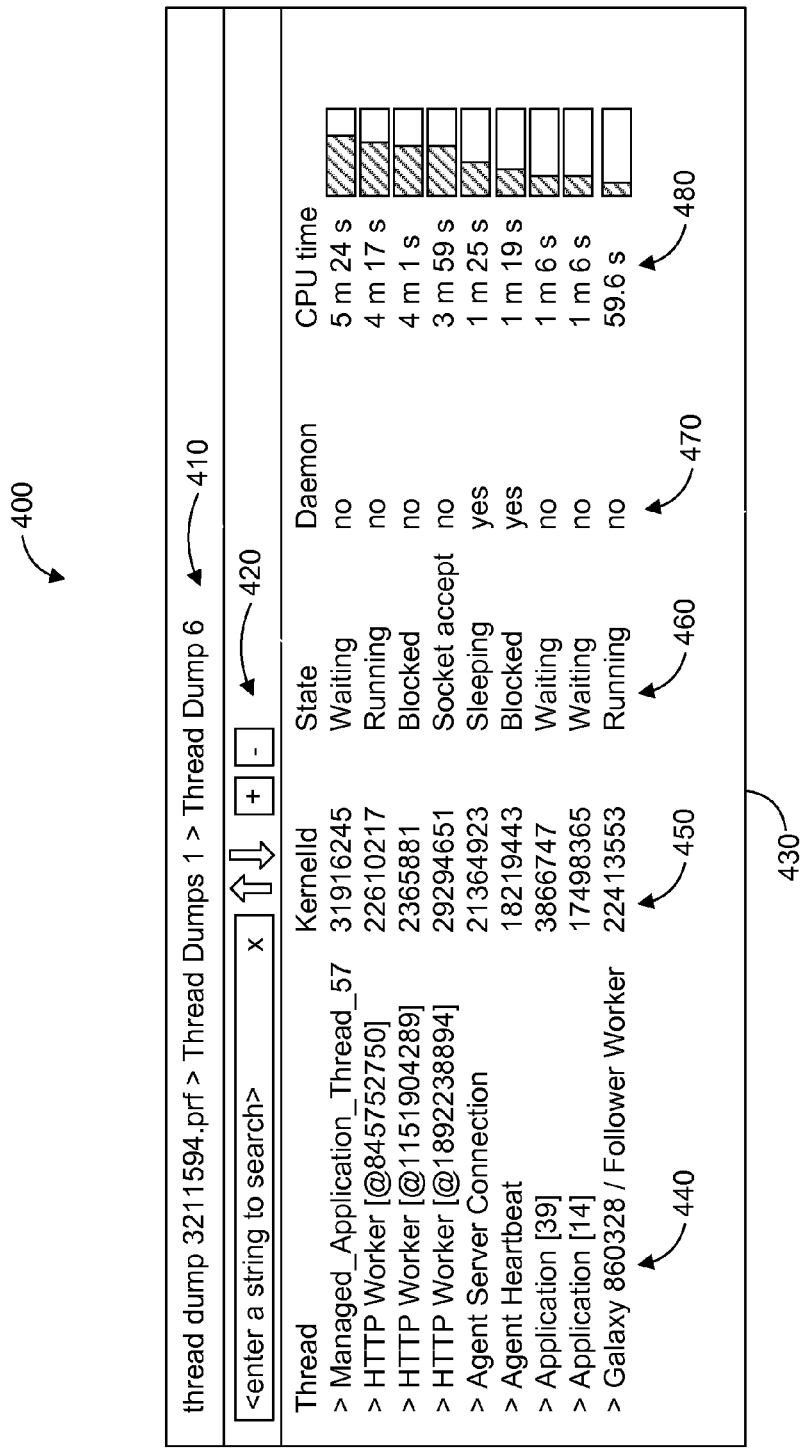
FIG. 4 is a user interface diagram, according to some example embodiments, suitable for implementing a thread dump viewer.

FIG. 4 is a user interface diagram 400, according to some example embodiments, of a user interface suitable for implementing a thread dump viewer. The user interface diagram 400 includes a title 410, a tool bar 420, and a table 430 of data regarding the threads in the thread dump including columns 440-480 with name, kernel identifier, state, daemon indicator, and CPU time for each thread. The user interface diagram 400 corresponds to a user interface presented by the user interface module 360, in some example embodiments.

The title 410 shows the name of the file containing the thread dump, including the path to the thread dump. The tool bar 420 shows user interface elements operable to change the data shown in the table 430. For example, a search tool to search for threads matching a search string, next and previous arrows for navigating between matching threads, and plus and minus tools for adding and removing columns from the table may be shown.

Each of the thread names shown in the column 440 is accompanied by a right-pointing arrow that indicates that the information for the thread can be expanded to include a stack trace. Each of the kernel identifiers in the column 450 shows an identifier for the thread used by the operating system or JVM kernel. The states in the column 460 indicate whether each thread was waiting, running, blocked, sleeping, waiting for a socket to be created (e.g., in a "socket accept" state), or in another state at the time the thread dump was created. In embodiments, other possible states in the column 460 include socket read, socket write, file read, file write, socket I/O, and file I/O. The daemon indicators in the column 470 show a "yes" or "no" for each thread to indicate whether or not that thread is a daemon. The CPU times in the column 480 show the CPU time consumed by each thread. A graphical indicator to the right of each CPU time in the column 480 shows the amount of CPU time for the thread in relation to the total CPU time for all threads.

Figure 5:
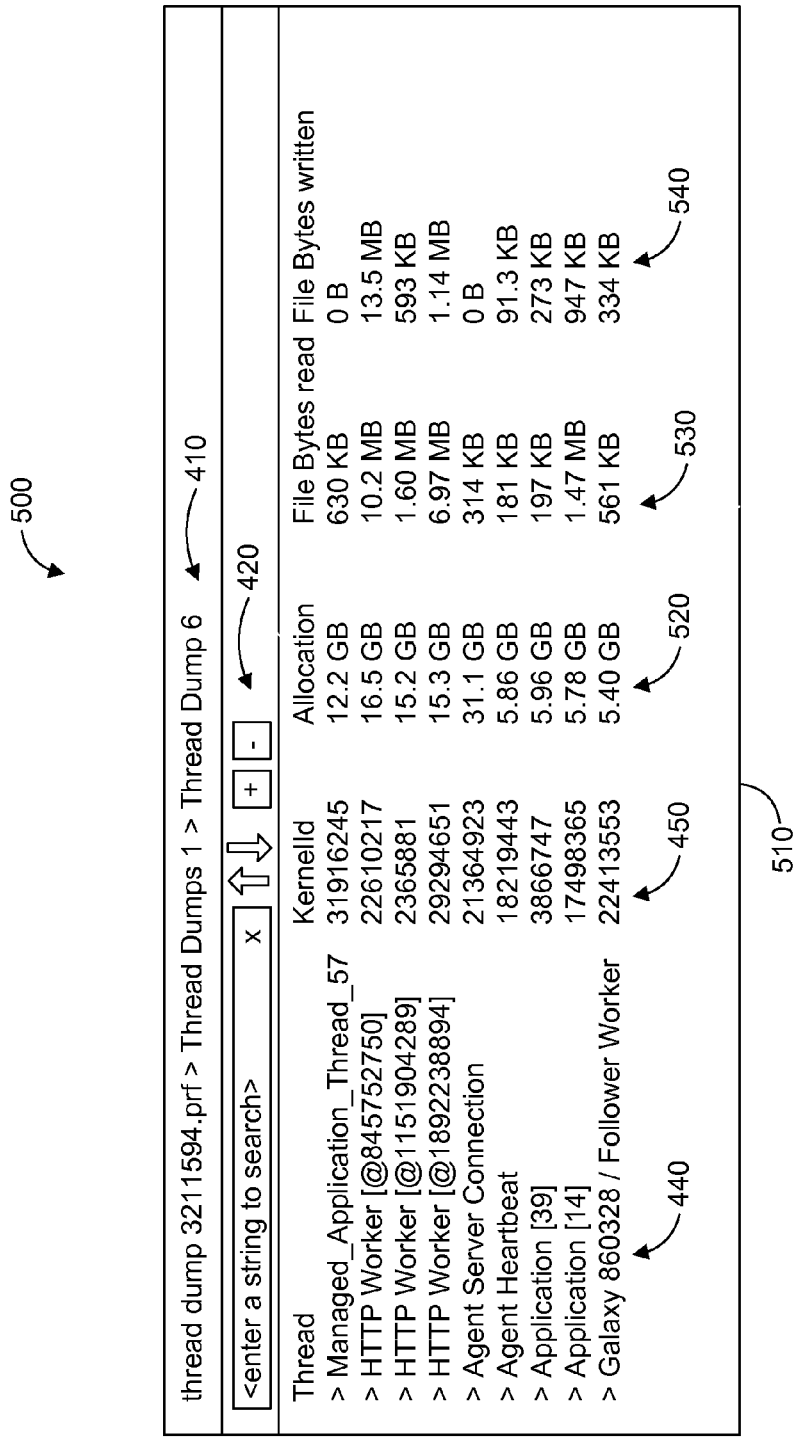
FIG. 5 is a user interface diagram, according to some example embodiments, suitable for implementing a thread dump viewer.

FIG. 5 is a user interface diagram 500, according to some example embodiments, of a user interface suitable for implementing a thread dump viewer. The user interface diagram 500 includes a title 410, a tool bar 420, and a table 510 of data regarding the threads in the thread dump including columns 440, 450, 520, 530, and 540 with name, kernel identifier, memory allocation, number of bytes read from files, and number of bytes written to files for each thread. The title 410, tool bar 420, names 440, and kernel identifier 450 are described above with respect to FIG. 4. As shown by FIG. 5, more, fewer, or different columns of data may be shown for each thread in different embodiments. The user interface diagram 500 corresponds to a user interface presented by the user interface module 360, in some example embodiments.

Each memory allocation shown in the column 520 shows the amount of memory allocated by the thread. The number of bytes read from files shown in the column 530 shows the total amount of data read from files by the thread. The number of bytes written to files shown in the column 540 shows the amount of data written to files by the thread. In some example embodiments, additional columns are presented, such as a number of open files, a number of open sockets, an amount of data read from or written to sockets, and so on.

FIG. 6 is a user interface diagram 600, according to some example embodiments, of a user interface suitable for implementing a thread dump viewer. The user interface diagram 600 includes a title 410, a tool bar 420, and a table 610 of data regarding the threads in the thread dump including columns 440, 450, 520, 530, and 540 with name, kernel identifier, memory allocation, number of bytes read from files, and number of bytes written to files for each thread. The title 410, tool bar 420, column 440, and column 450 are described above with respect to FIG. 4. The columns 520-540 are described above with respect to FIG. 5. The table 610 is shown with a stack trace 620 for the thread named Agent Heartbeat shown in-line. The user interface diagram 600 corresponds to a user interface presented by the user interface module 360, in some example embodiments.

Instead of a rightward-pointing arrow, the row for the thread named Agent Heartbeat includes a downward-pointing triangle, indicating that additional data for the thread is shown below. In this case, the additional data is the stack trace 620. As shown in FIG. 6, the additional data is indented to show that it is related to the thread rather than being part of the table. The downward-pointing triangle may be operable to hide the additional data.

The stack trace 620 shows that the currently executing method is com.sun.jmx.interceptor.DefaultMBeanServerInterceptor.getMBean, as well as the methods that called the currently executing method. Additionally, information is presented showing that the current method is blocked along with information about the lock object on which the method is blocked. Like the Agent Heartbeat thread, the line in the stack trace 620 with the blocked method includes a downward-pointing triangle, indicating that the following line includes additional information about that portion of the stack trace 620. In this case, the type of the lock object and an identifier for the lock object are shown. At the bottom of the stack trace 620, an indication is presented of a number of hidden lines of the stack trace 620, along with a right-arrow that is operable to expand the stack trace display to show some or all of the hidden lines of the stack trace 620.

FIG. 7 is a user interface diagram 700, according to some example embodiments, of a user interface suitable for implementing a thread dump viewer. The user interface diagram 700 includes a title 410, a tool bar 420, and a table 710 of data regarding the threads in the thread dump including columns 440, 450, 520, 530, and 540 with name, kernel identifier, memory allocation, number of bytes read from files, and number of bytes written to files for each thread. The title 410, tool bar 420, column 440, and column 450 are described above with respect to FIG. 4. The columns 520-540 are described above with respect to FIG. 5. The table 710 is shown with a stack trace 720 for the thread named Agent Heartbeat shown in-line. Rows 730, 750, 760, and 780 are shown within the stack trace 720, showing information for threads related to the Agent Heartbeat thread corresponding to the stack trace 720. A stack trace 740 is shown nested within the stack trace 720. Similarly, a stack trace 770 is shown nested within the stack trace 740. The user interface diagram 700 corresponds to a user interface presented by the user interface module 360, in some example embodiments.

The stack trace 720 shows that the currently executing method is com.sun.jmx.interceptor.DefaultMBeanServerInterceptor.getMBean, as well as the methods that called the currently executing method. Additionally, information is presented showing that the current method is blocked along with information about the block. In this case, the type of the lock object and an identifier for the lock object are shown. The thread named HTTP Worker [@1697950221] is shown below the lock object, in the row 730, indicating that the thread holds the lock. Information for the blocking thread is shown in the table 710, including the name, kernel identifier, memory allocation, and file bytes read and written. A stack trace 740 for the blocking thread is shown nested within the stack trace 720 for the thread being viewed.

The stack trace 740 shows that the currently executing method is com.sun.jmx.mbeanserver.Repository.addAllMatching, as well as the methods that called the currently executing method. Additionally, information is presented showing that the method third deep in the stack has locked an object. Below that information, rows 750, 760, and 780 are shown, with information regarding threads that are waiting on the locked object. The name of the thread in row 750 is adjacent to a rightward-pointing arrow, indicating that more information about that thread is available. The name of the thread in row 760 does not have a rightward-pointing arrow, and the stack trace 770 is shown below row 760, containing the additional information about that thread. Rows 750, 760, and 780 are indented to show their position in the nested information being displayed in the stack trace 740.

At the bottom of the stack trace 720, an indication is presented of a number of hidden lines of the stack trace 720, along with a right-arrow that is operable to expand the stack trace display to show some or all of the hidden lines of the stack trace 720.

FIG. 8 is a user interface diagram 800, according to some example embodiments, of a user interface suitable for implementing a thread dump viewer. The user interface diagram 800 includes a title 410, a tool bar 420, and a table 810 of data regarding the threads in the thread dump including columns 440, 450, 520, 530, and 540 with name, kernel identifier, memory allocation, number of bytes read from files, and number of bytes written to files for each thread. The title 410, tool bar 420, column 440, and column 450 are described above with respect to FIG. 4. The columns 520-540 are described above with respect to FIG. 5. The table 810 is shown with a stack trace 820 for the thread named Agent Heartbeat shown in-line. Rows 730, 840, and 780 are shown within the stack trace 820, showing information for threads related to the Agent Heartbeat thread corresponding to the stack trace 820. Rows 730 and 780 are described above with respect to FIG. 7. A stack trace 830 is shown nested within the stack trace 820. Similarly, a stack trace 850 is shown nested within the stack trace 830. The user interface diagram 800 corresponds to a user interface presented by the user interface module 360, in some example embodiments.

The stack trace 820 shows that the currently executing method is com.sun.jmx.interceptor.DefaultMBeanServerInterceptor.getMBean, as well as the methods that called the currently executing method. Additionally, information is presented showing that the current method is blocked along with information about the block. In this case, the type of the lock object and an identifier for the lock object are shown. The thread named HTTP Worker [@1697950221] is shown below the lock object, in the row 730, indicating that the thread holds the lock. Information for the blocking thread is shown in the table 710, including the name, kernel identifier, memory allocation, and file bytes read and written. A stack trace 830 for the blocking thread is shown nested within the stack trace 720 for the thread being viewed.

The stack trace 830 shows the currently executing method com.sun.jmx.interceptor.DefaultMBeanServerInterceptor.queryNamesImpl, as well as the methods that called the currently executing method. Additionally, information is presented showing that the method is blocked on a lock object. Below that information, row 840 is shown, with information regarding the thread that holds the lock object. The stack trace 850 is shown below row 840, containing additional information about that thread.

At the bottom of the stack trace 820, an indication is presented of a number of hidden lines of the stack trace 820, along with a right-arrow that is operable to expand the stack trace display to show some or all of the hidden lines of the stack trace 820.

Figure 9:
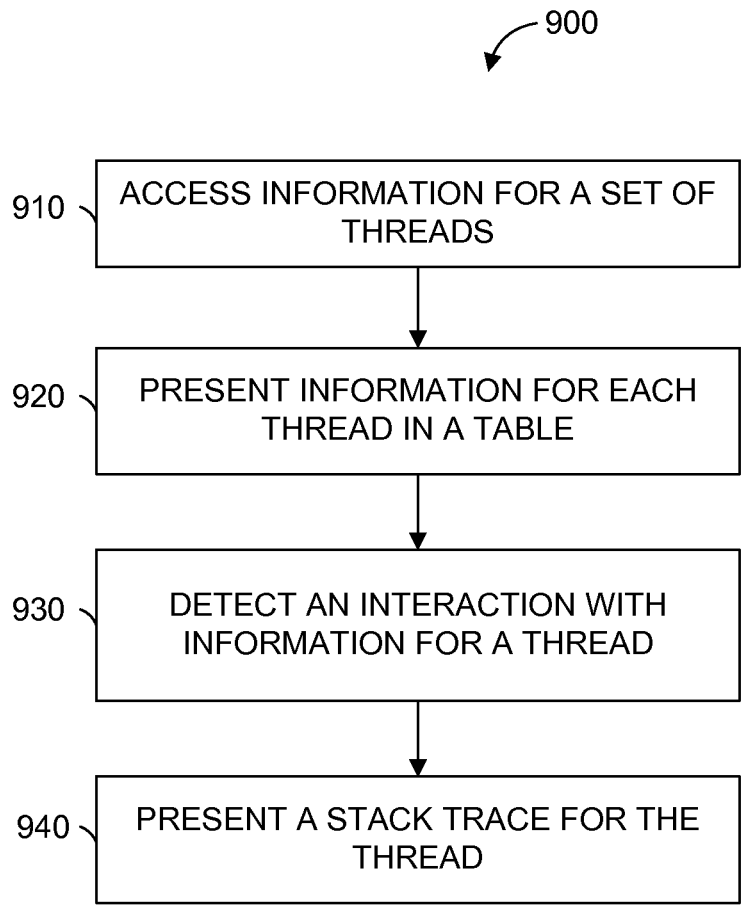
FIG. 9 is a flowchart illustrating an example method, according to some example embodiments, of devices performing various operations to present thread dumps.

FIG. 9 is a flowchart illustrating an example method 900 of presenting a thread dump viewer, according to some example embodiments. Operations in the method 900 are described as being performed by the server machine 110 and the device 130, using modules described above with respect to FIG. 2 and FIG. 3, by way of example. As shown in FIG. 9, the method 900 includes operations 910, 920, 930, and 940.

In operation 910, the analysis module 240 accesses information for a set of threads. For example, one or more thread dump files may be accessed and data for one or more of the dumped threads retrieved.

The communication module 210 or the UI module 360 causes the presentation of information for each thread in the set of threads, in operation 920. For example, the user device 130 may be a desktop computer with a display device, and the UI module 360 may present a table of data on the display.

As another example, the server machine 110 may be a web server, and the communication module 210 may transmit HTML files, image files, and the like to the communication module 310 of the user device 130 for display by the UI module 360 to a user 132. The information presented may be formatted as shown in FIG. 5, above, or in other ways.

In operation 930, an interaction with information for a thread is detected by the UI module 360. For example, the user may click on the name of a thread in a table, use arrow keys on a keyboard, touch a touch screen, or otherwise indicate a particular thread for which more information is desired.

A stack trace for the thread is presented in response to the interaction (operation 940). For example, the user interface of FIG. 6, including a stack trace for the thread with kernel identifier 18219443 may be presented in response to a user touching, hovering over, or clicking on the corresponding name ("Agent Heartbeat"), the rightward-pointing arrow adjacent to the name, any location on the corresponding row, or some other predetermined hot spot. In some example embodiments, the stack trace is shown based on a user preference to initially show the table with all stack traces expanded, stack traces containing blocked threads expanded, or some other user criteria. Once a stack trace is presented, further interaction with the information for the thread can cause the stack trace to be hidden.

Figure 10:
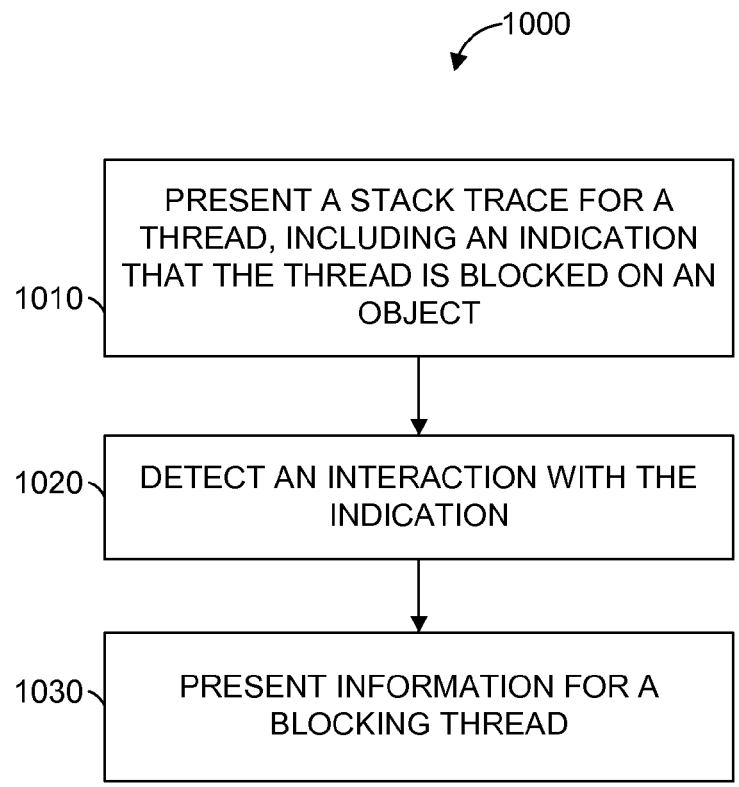
FIG. 10 is a flowchart illustrating an example method, according to some example embodiments, of devices performing various operations to present thread dumps.

FIG. 10 is a flowchart illustrating an example method 1000 of presenting a thread dump viewer, according to some example embodiments. Operations in the method 1000 are described as being performed by the server machine 110 and the device 130, using modules described above with respect to FIG. 2 and FIG. 3, by way of example. As shown in FIG. 10, the method 1000 includes operations 1010, 1020, and 1030.

In operation 1010, the communication module 210 or the UI module 360 causes the presentation of a stack trace for a thread, including an indication that the thread is blocked on a lock object. Operation 1010 may be substituted for operation 940 in the method 900, when appropriate. The information presented may be formatted as shown in the stack trace 620 of FIG. 6 or in other ways.

An interaction with the indication that the thread is blocked is detected by the UI module 360 in operation 1020. For example, the user may click on the name of a lock object on which the thread is waiting in the stack trace, use arrow keys on a keyboard, touch a touch screen, or otherwise indicate a particular block for which more information is desired.

A stack trace for a thread causing the block is presented (operation 1030) in response to the interaction. For example, the user interface of FIG. 7, including a stack trace 740 for the thread with kernel identifier 40763465 may be presented in response to a user touching, hovering over, or clicking on the name of the blocking method, "com.sun.jmx.interceptor.DefaultMBeanServerInterceptor.getMBean," any location on the corresponding line, or some other predetermined hot spot. In some example embodiments, the stack trace is shown based on a user preference to initially show the table with first-level blocking threads expanded or some other user criteria. Once a stack trace is presented, further interaction with the indication that the blocked thread is blocked can cause the stack trace of the blocking thread to be hidden.

Figure 11:
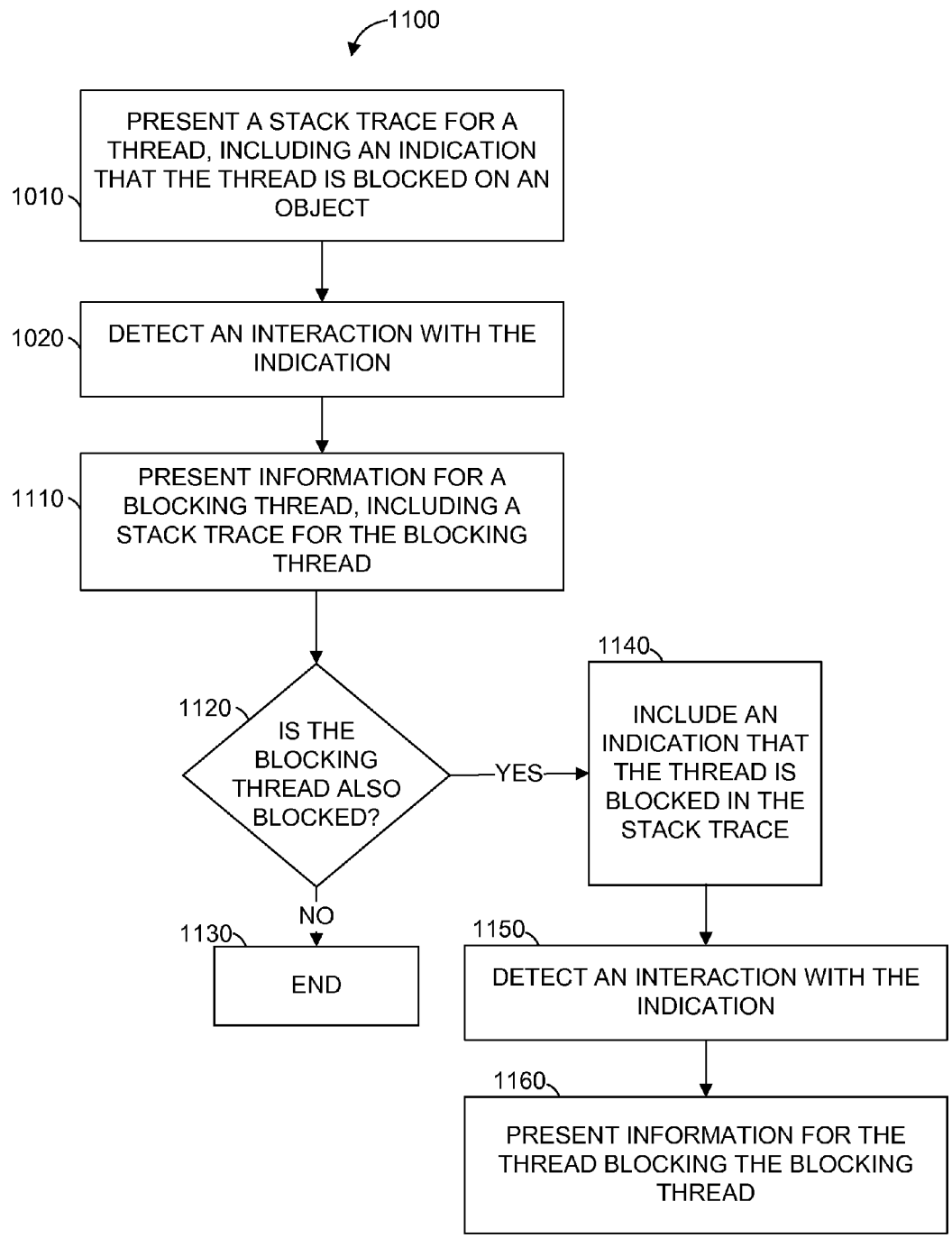
FIG. 11 is a flowchart illustrating an example method, according to some example embodiments, of devices performing various operations to present thread dumps.

FIG. 11 is a flowchart illustrating an example method 1100 of presenting a thread dump viewer, according to some example embodiments. Operations in the method 1100 are described, merely by way of example, as being performed by the server machine 110 and the device 130, using modules described above with respect to FIG. 2 and FIG. 3. As shown in FIG. 11, the method 1100 includes operations 1010, 1020, 1110, 1120, 1130, 1140, 1150, and 1160. The operations 1010 and 1020 are described above with respect to FIG. 10.

In operation 1110, information for a blocking thread, including a stack trace for the blocking thread, is presented by the UI module 360. The stack trace 740 of FIG. 7 for the blocking thread identified in the row 730 is an example of such information.

Thereafter, as shown in operation 1120, a check is made to determine if the blocking thread is also blocked by the analysis module 240 or the UI module 360. If the thread is not blocked, the method 1100 is complete (see operation 1130).

Based on the determination that the blocking thread is blocked, as shown in operation 1140, an indication that the thread is blocked is included in the stack trace presented in operation 1110. For example, an icon can be shown in the stack trace, information for a lock object can be presented, or another indication can be made. As an example, in FIG. 8, the stack trace 830 includes an indication that the blocking HTTP Worker thread in the row 730 is blocked in the queryNamesImpl method by an object of type DefaultMBeanServerInterceptor.

An interaction with the indication is detected by the UI module 360 (see operation 1150). For example, the user may click on the name of a lock object in the stack trace, use arrow keys on a keyboard, touch a touch screen, or otherwise indicate a particular block for which more information is desired.

In operation 1160, responsive to the interaction with the indication, information for the thread blocking the blocking thread is presented by the UI module 360. For example, a row may be added to a table of thread information, a stack trace for the second blocking thread may be presented, or other information for the second blocking thread may be presented.

According to various example embodiments, one or more of the methodologies described herein may facilitate presentation of data using a thread dump viewer. According to various example embodiments, one or more of the methodologies described herein may allow application developers to more quickly identify blocking threads and performance bottlenecks, maximizing the impact of development efforts.

When these effects are considered in aggregate, one or more of the methodologies described herein may obviate a need for certain efforts or resources that otherwise would be involved in diagnosing problems in applications. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 12:
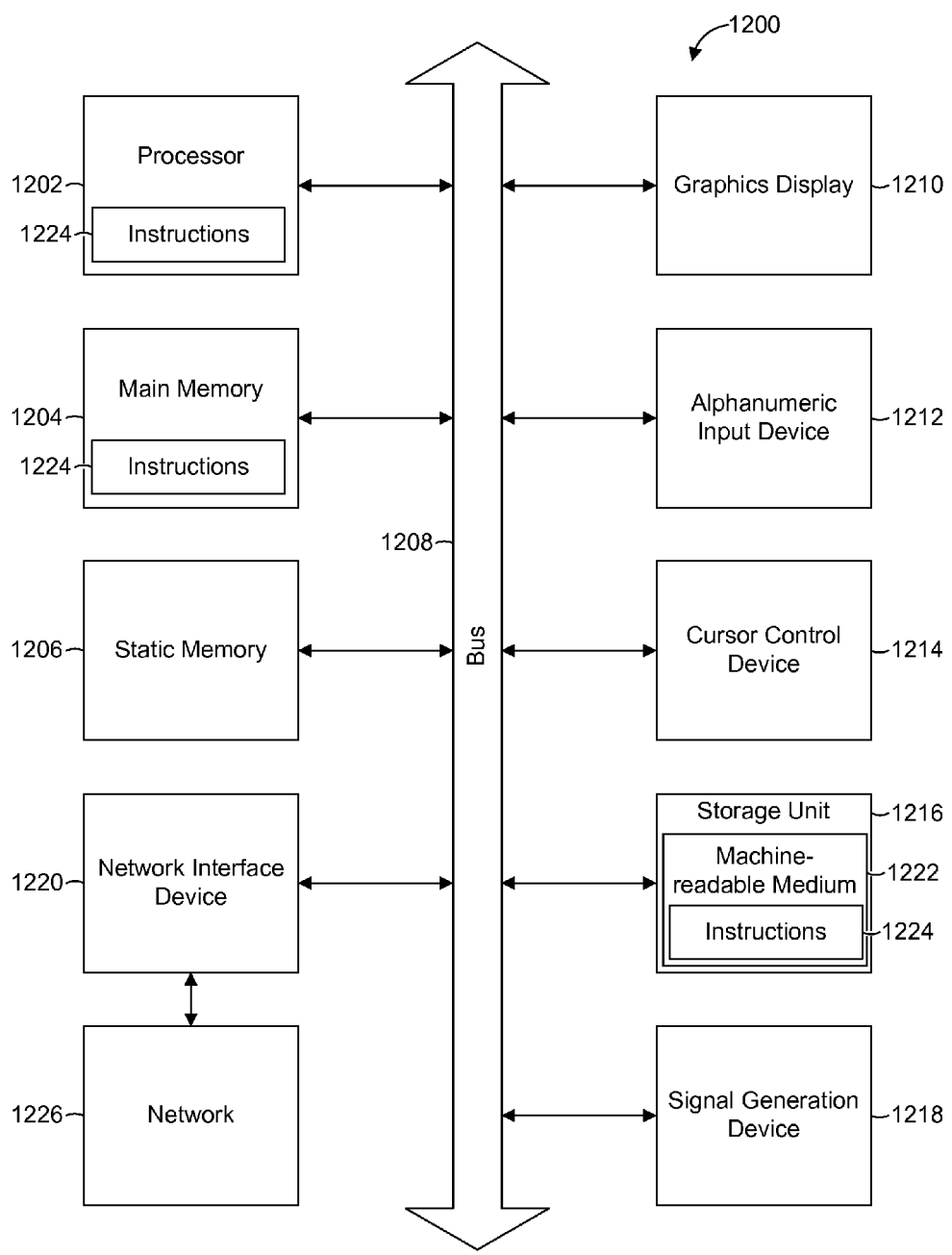
FIG. 12 is a block diagram illustrating components of a machine, according to some example embodiments, for performing any of the methodologies described herein.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a set-top box (STB), a personal digital assistant (PDA), a cellular telephone, a smart phone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or another pointing instrument), a storage unit 1216, a signal generation device 1218 (e.g., a speaker), and a network interface device 1220.

The storage unit 1216 includes a machine-readable medium 1222 on which are stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 190) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated examples define various example embodiments of methods, machine-readable media, and systems (e.g., apparatus) discussed herein:

Example 1

A method comprising:
accessing information for a plurality of threads in a thread dump generated during an execution of an application;
presenting information for each thread of the plurality of threads in a table on a display device;
detecting a user interaction with information for a thread of the plurality of threads; and
responsive to the user interaction, presenting a stack trace for the thread.

Example 2

The method of example 1, wherein the stack trace includes an indication that the thread is blocked on a lock object.

Example 3

The method of example 2, further comprising:
responsive to a user interaction with the object, presenting information for a blocking thread.

Example 4

The method of example 3, further comprising:
responsive to a user interaction with the information for the blocking thread, presenting a stack trace for the blocking thread.

Example 5

The method of example 4, wherein the stack trace for the blocking thread includes an indication that the blocking thread is blocked on a second lock object; and further comprising:

responsive to a user interaction with the second object, presenting information for a second blocking thread.

Example 6

The method of any suitable one of examples 1-5, wherein the information for each thread of the plurality of threads includes a kernel identifier, a state, a CPU time, and a number of allocated bytes.

Example 7

The method of example 6, wherein the state is selected from the group consisting of waiting, running, blocked, sleeping, socket read, socket write, file read, file write, or socket connect.

Example 8

The method of any suitable one of examples 1-7, wherein the presenting of the stack trace for the thread presents the stack trace in-line with the table.

Example 9

The method of example 8, wherein the presenting of the stack trace includes presenting a portion of the stack trace above information for a blocking thread and presenting a portion of the stack trace below the information for the blocking thread.

Example 10

The method of any suitable one of examples 1-9, wherein information for a thread referenced within a stack trace is presented as a row in the table.

Example 11

A system comprising:
a database module, configured to:
access information for a plurality of threads in a thread dump generated during an execution of an application; and
a user interface module, configured to:
present information for each thread of the plurality of threads in a table on a display device;
detect a user interaction with information for a thread of the plurality of threads; and
responsive to the user interaction, present a stack trace for the thread.

Example 12

The system of example 11, wherein the stack trace includes an indication that the thread is blocked on a lock object.

Example 13

The system of example 12, wherein the user interface module is further configured to:
responsive to a user interaction with the object, present information for a blocking thread.

Example 14

The system of example 13, wherein the user interface module is further configured to:

responsive to a user interaction with the information for the blocking thread, present a stack trace for the blocking thread.

Example 15

The system of example 14, wherein the stack trace for the blocking thread includes an indication that the blocking thread is blocked on a second lock object; and wherein the user interface module is further configured to:
responsive to a user interaction with the second object, present information for a second blocking thread.

Example 16

The system of any suitable one of examples 11-15, wherein the information for each thread of the plurality of threads includes a kernel identifier, a state, a CPU time, and a number of allocated bytes.

Example 17

The system of example 16, wherein the state is selected from the group consisting of waiting, running, blocked, sleeping, socket read, socket write, file read, file write, and socket accept.

Example 18

The system of any suitable one of examples 11-17, wherein the presenting of the stack trace for the thread presents the stack trace in-line with the table.

Example 19

The system of any suitable one of examples 11-18, wherein:
the presenting of the stack trace includes presenting a portion of the stack trace above information for a blocking thread and presenting a portion of the stack trace below the information for the blocking thread; and
information for a thread referenced within a stack trace is presented as a row in the table.

Example 20

A non-transitory machine-readable storage medium comprising instructions that, when executed by one or more processors of a machine, cause the machine to perform operations comprising:
accessing information for a plurality of threads in a thread dump generated during an execution of an application;
presenting information for each thread of the plurality of threads in a table on a display device;
detecting a user interaction with information for a thread of the plurality of threads; and
responsive to the user interaction, presenting a stack trace for the thread.

What is claimed is:
1. A method comprising:
accessing information for a plurality of threads in a thread dump generated during an execution of an application;
causing presentation of information for each thread of the plurality of threads in a table on a display device;
detecting a user interaction with information for a thread of the plurality of threads;
responsive to the user interaction, causing presentation, for the thread, of a stack trace that includes an indication that the thread is blocked on a lock object locked by a blocking thread; and
responsive to a user interaction with the indication, causing, by a processor of a machine, presentation of information for the blocking thread.
2. The method of claim 1, further comprising:
responsive to a user interaction with the information for the blocking thread, causing presentation of a stack trace for the blocking thread.
3. The method of claim 2, wherein the stack trace for the blocking thread includes a second indicator that indicates that the blocking thread is blocked on a second lock object; and further comprising:
responsive to a user interaction with the second indicator, causing presentation of information for a second blocking thread.
4. The method of claim 1, wherein the information for each thread of the plurality of threads includes a kernel identifier, a state, a CPU time, and a number of allocated bytes.
5. The method of claim 4, wherein the state is selected from the group consisting of waiting, running, blocked, sleeping, socket read, socket write, file read, file write, and socket accept.
6. The method of claim 1, wherein the causing of the presentation of the stack trace for the thread causes the stack trace to be presented in-line with the table.
7. The method of claim 6, wherein the causing of the presentation of the stack trace includes causing a first portion of the stack trace to be presented above information for a blocking thread and causing a second portion of the stack trace to be presented below the information for the blocking thread.
8. The method of claim 7, wherein information for the blocking thread is presented as a row in the table.
9. A system comprising:
a memory; and
one or more processors configured by instructions to perform operations comprising:
accessing information in the memory for a plurality of threads in a thread dump generated during an execution of an application;
causing presentation of information for each thread of the plurality of threads in a table on a display device;
detecting a user interaction with information for a thread of the plurality of threads; and
responsive to the user interaction, causing presentation, for the thread, of a stack trace that includes an indication that the thread is blocked on a lock object locked by a blocking thread; and
responsive to a user interaction with the indication, causing presentation of information for the blocking thread.
10. The system of claim 9, wherein the operations further comprise:
responsive to a user interaction with the information for the blocking thread, causing presentation of a stack trace for the blocking thread.
11. The system of claim 10, wherein the stack trace for the blocking thread includes a second indicator that indicates that the blocking thread is blocked on a second lock object locked by a second blocking thread; and wherein the operations further comprise:
responsive to a user interaction with the second object, causing presentation of information for the second blocking thread.

12. The system of claim 9, wherein the information for each thread of the plurality of threads includes a kernel identifier, a state, a CPU time, and a number of allocated bytes.

13. The system of claim 12, wherein the state is selected from the group consisting of waiting, running, blocked, sleeping, socket read, socket write, file read, file write, and socket accept.

14. The system of claim 9, wherein the causing of the presentation of the stack trace for the thread causes the stack trace to be presented in-line with the table.

15. The system of claim 14, wherein:
the causing of the presentation of the stack trace includes causing a first portion of the stack trace to be presented above information for a blocking thread and causing a second portion of the stack trace to be presented below the information for the blocking thread; and
the information for the blocking thread is presented as a row in the table.

16. A non-transitory machine-readable storage medium comprising instructions that, when executed by one or more processors of a machine, cause the machine to perform operations comprising:
accessing information for a plurality of threads in a thread dump generated during an execution of an application;
presenting causing presentation of information for each thread of the plurality of threads in a table on a display device;
detecting a user interaction with information for a thread of the plurality of threads;
responsive to the user interaction, presenting a stack trace causing presentation, for the thread, of a stack trace that includes an indication that the thread is blocked on a lock object locked by a blocking thread; and
responsive to a user interaction with the indication, causing presentation of information for the blocking thread.

* * * * *